3,100,149
COMPOSITION AND PROCESS FOR PROMOTING THE GROWTH OF PLANTS

Ulrich Ruge, Hamburg, Germany, assignor to C. F. Boehringer & Soehne G.m.b.H., Mannheim-Waldhof, Germany, a corporation of Germany
No Drawing. Filed June 14, 1960, Ser. No. 35,895
Claims priority, application Germany June 16, 1959
5 Claims. (Cl. 71—2.3)

The present invention relates to agents which have plant growth promoting properties and more particularly to such agents derived from metabolic products of the mold *Gibberella fujikuroi*, to compositions containing same, and to methods of using such compositions as growth promoting agents.

It is known that metabolic products of the mold *Gibberella fujikuroi*, the so-called gibberellins, have a growth promoting effect on many plants. Compare, for instance, the comprehensive review in the "Zeitschrift fuer Acker- und Pflanzenbau," vol. 107, pages 147 to 170 (1958).

On the other hand, it is also known that a treatment of plants with gibberellins has a number of serious disadvantages:

(1) Such a treatment causes chlorosis, i.e. a reduction in the chlorophyll content of the plant. According to the literature such chlorosis is said to gradually recede on application of sufficient amounts of fertilizer.

(2) It causes successive growth due to extraordinary elongation of the internodes, which process is called gibberellin-etiolation.

(3) It effects changes in the shape of the leaves, especially considerably narrowing of the leaf blades.

It is one object of the present invention to provide a new and valuable composition which has a remarkable plant growth promoting effect, but which does not have the disadvantages of the known gibberellins as mentioned hereinabove.

Another object of the present invention is to provide a highly effective method of using such compositions as growth promoting agents.

Other objects of the present invention and advantageous features thereof will become apparent as the description proceeds.

In principle, the new plant growth promoting agent according to the present invention is characterized by its content of gibberellic acid or its alkali salts and the degradation product of yeast nucleic acid.

The term "degradation product of yeast nucleic acid," as used hereinafter and in the annexed claims, comprises the mixture of purine bases, pyrimidine bases, nucleosides, and nucleotides which is obtained by hydrolyzing yeast nucleic acid with mineral acids as described by Levène et al., Ber. 44, 1028 (1911); see also Kerr et al., J. biol. Chem. 181, 761 (1949). Levene et al. proceed as follows: 100 g. of the starting yeast nucleic acid are heated to boiling under reflux in one liter of 2% sulfuric acid in an oil bath (125° C.) for two hours. An excess of pure silver oxide is added to the resulting liquid after cooling the same slightly. Thereby the silver salts of the purine bases precipitate. To complete precipitation, the mixture is allowed to stand overnight and the silver salts of the purine bases are separated by filtration. The filtrate is neutralized and chemically pure barium hydroxide solution is added causing the silver salts of the nucleotides and silver phosphate to precipitate. The precipitate is dissolved in sulfuric acid, freed of silver by the introduction of hydrogen sulfide, the silver sulfide is filtered off, the filtrate is exactly neutralized against phenolphthalein by the addition of barium hydroxide solution, barium phosphate is filtered off, and the resulting filtrate is evaporated almost to dryness in a vacuum. Thereby, part of the salts is converted into a water insoluble form. The mixture is dissolved in acetic acid and the solution is added to absolute ethanol whereby the barium salts of the pyrimidine nucleotides precipitate. This crude product is already substantially free of nucleic acids or of purine containing complex compounds.

Kerr et al. also describe procedures of preparing acid hydrolysis products of yeast nucleic acid which substantially consist of adenine, and guanine, i.e. the purine bases, and uridine monophosphate and cytidine monophosphate, i.e. the pyrimidine monophosphates or nucleotides.

It has been mentioned in the scientific literature, that purine bases such as adenine and guanine are affecting the growth of isolated parts of plants or of plant tissue segments. However, this observation has not found any practical application. This is due to the fact that the cleavage product of yeast nucleic acid applied as such to intact plants of higher order does not affect their growth. This is clearly shown in Table I given hereinafter. It is, therefore, very surprising that, when using compositions containing gibberellic acid as well as the degradation product of yeast nucleic acid, a growth promoting effect is achieved which far exceeds the growth promoting effect achieved by the gibberellic acid when applied alone. In Table I experimental data are given which show the effect of the degradation product of yeast nucleic acid obtained by hydrolysis by means of mineral acid, of gibberellic acid, and of a mixture of both agents.

TABLE I
Leaf growth of *Lactuca sativa*

[Relative values, compared with control values=100]

| Agent | Dry weight | Length | Width | Area |
|---|---|---|---|---|
| $K_o$ | 100 | 100 | 100 | 100 |
| N | 101.6 | 100 | 97.0 | 97.9 |
| G | 128.5 | 142.5 | 110.4 | 122.0 |
| G+N | 147.8 | 157.4 | 120.6 | 141.1 |

$K_o$ = Controls (untreated).
$N$ = Treated with an aqueous solution of 1 g./l. of the mixture of purine bases, pyrimidine bases, nucleosides, and nucleotides (containing especially adenine, guanine, uridine monophosphate, and cytidine monophosphate) obtained by acid hydrolysis of yeast nucleic acid.
$G$ = Treated with an aqueous solution of 10 mg./l. of the potassium salt of gibberellic acid.
$G+N$ = Treated with a mixture of $G+N$ in the above given amounts.

Five drops of the above mentioned solutions N, G, or the mixture of N+G were applied daily, by means of a pipette, to the vegetation cone of young lettuce plants for 6 days. The leaves which were grown during said treatment were removed 14 days after the last application and were measured. It is evident from Table I that, when treating the plants with the degradation product of yeast nucleic acid alone, the results are substantially identical with the control values within the limit of error. The results achieved with the mixture of said nucleic acid degradation product and gibberellic acid, however, are about 100% better than those achieved with pure gibberellic acid alone, indicating a highly and entirely unexpected synergistic effect.

The advantages produced by the agents according to the present invention and particularly their effect on plant growth will be explained hereinafter more in detail.

By using the composition according to the present invention a remarkable increase in the vegetative growth of young plants is observed which is considerably more pronounced than that caused by pure gibberellins. The following table serves to illustrate this surprising effect.

TABLE II

*Fuchsia hybrida* var. *beacon*

[Relative values, compared with control value=100]

| Agent | Length of shoot | Length of leaf (without petiole) | Leaves of the leading shoot, green weight |
|---|---|---|---|
| Ko | 100 | 100 | 100 |
| G | 133.4 | 131.9 | 104.8 |
| G+N | 194.0 | 144.4 | 119.0 |

Ko=Controls.
N=Treated with an aqueous solution of 500 mg./l. of the mixture of purine bases, pyrimidine bases, nucleosides, and nucleotides (containing especially adenine, guanine, uridine monophosphate, and cytidine monophosphate) obtained by acid hydrolysis of yeast nucleic acid.
G=Treated with an aqueous solution of 10 mg./l. of the potassium salt of gibberellic acid.
G+N=Treated with a mixture of G+N in the above given amounts.

The young plants were sprayed five times in weekly intervals with the above mentioned solutions. Three weeks after completing the treatment, the shoots and leaves of the plants were measured. It is evident that the mixture of gibberellic acid and nucleic acid degradation product surprisingly increases the growth promoting power of gibberellic acid. If the treatment according to the present invention is continued for a few more months in a somewhat different manner, namely with removal of the lateral shoots, long-stemmed Fuchsia plants were obtained as they are very popular for growing in ornamental gardens and parks. While growing of this kind of Fuchsia plants normally requires 3 to 4 years, small tree-like plants can be obtained after only 6 months when treating the plants with compositions according to the present invention. After such a short period of time plants 1.6 m. high with a well lignified trunk and carrying a fully developed and normally flowering shrub-like top are obtained.

When treating cut-flowers with the compositions according to the present invention, the growth promoting effect is evidenced in a very desirable elongation of the pedicels, for instance, of roses or chrysanthemums. Thereby, the keeping qualities of such cut flowers is not at all impaired, but is even improved.

When comparing the plants treated with compositions according to the present invention with plants treated with gibberellin, it was found that they are distinguished from the gibberellin-treated plants by their healthy and harmonious appearance. Chlorosis was not observed. Likewise, no changes in the shape of the leaves were encountered. An especially noteworthy effect of the composition according to the present invention is the increase in the rate of development of the lateral buds, causing a shrub-like, harmonious growth of the treated plants. Table III shows this advantageous effect.

TABLE III

*Fuchsia hybrida* var. *beacon*

[Relative values, compared with control values=100]

| Agent | Number of lateral shoots | Green weight Lateral shoots | Green weight Total shoots |
|---|---|---|---|
| Ko | 100 | 100 | 100 |
| G | 133.3 | 184.8 | 127.0 |
| G+N | 188.8 | 212.0 | 154.9 |

Note.—The symbols Ko, G, and N used in this table have the same meaning as those used in table II.

The surprising effects of the treatment according to the present invention are evident.

When spraying *Asparagus sprengeri* twice with a composition comprising 50 mg./l. gibberellic acid and 500 mg./l. of the degradation product of yeast nucleic acid within 8 days, 20 new shoots developed as compared with 4 to 5 shoots in control plants. After a treatment for 7 weeks and spraying the plants once every week, the shoots were 20 cm. longer than those of control plants and showed twice as many scale-like leaves.

A further advantageous effect of the compositions according to the present invention is the promotion of flower development. As a result thereof, flowering sets in much earlier and the plants are ready for sale at an earlier date. In addition thereto, the number of fully developed flowers is increased. By spraying, for instance, plants of the genus Cyclamen in the budding state when buds just become visible with the composition according to the present invention, 8 to 10 completely opened flowers can be counted, while untreated plants have only 1 to 2 half-opened flowers. In many cases an increase in the size of the flowers is also achieved.

The following Table IV illustrates this increase in size.

TABLE IV

*Fuchsia hybrida* var. *beacn*

[Relative values, compared with control value = 100]

| Agent | Length of the red sepals | Length of the blue petals |
|---|---|---|
| Ko | 100 | 100 |
| G | 121.5 | 131.8 |
| G+N | 145.1 | 145.4 |

Note.—The symbols Ko, G, and N used in this table have the same meaning as those used in Table II.

Treatment of plants with the compositions according to the present invention makes it possible to overcome cessation in growth. It was observed, for instance, that old stands of peonies, which had not produced flowers for several years, were caused to flower after a single treatment with the composition according to the present invention. From the viewpoint of a gardener this effect is of the greatest importance, especially when considering that cessation in growth usually is encountered on transplanting small seedlings or larger plants.

Still another effect of the treatment according to the present invention is to overcome the periods of rest of plants. Thus it is possible to cause biennial or winter-annual plants, such as cabbage or carrots to flower and produce seeds in their first year of cultivation. In tree nurseries the summer rest period can be overcome and a regular second annual shoot or after sprig may be obtained. As a result thereof the young plants, trees, and shrubs can be sold at an earlier date.

Plants, which rest during the winter, for instance, house plants and several years-old greenhouse plants can be caused to shoot forth even during the winter months. Elimination of the rest period is also of importance for plant breeding. It permits, for instance, to sow potatoes immediately after the harvest and thus to propagate a new strain of potatoes in several generations within one year.

When treating seeds, which require a prolonged period of time for subsequent ripening, according to the present invention, germination is considerably accelerated. This is of considerable importance, for instance, for producing brewing barley because, immediately after harvesting at the end of August, barley ordinarily does not possess the germinating power required for malting.

Treatment according to the present invention also accelerates growth of the pollen tube and thus ensures proper fertilization. This is of importance especially for producing hybrids.

Applying more concentrated compositions according to the present invention results in a temporary retardation of the budding process. This retardation is limited to budding. Such an effect is observed on graft vine whereby too rapid shooting forth of the epigeous shoot causes 40% to 50% failures because not enough roots were produced. Applying ten times the usual amount of the composition according to the present invention results in a temporary retardation of the growth of the shoots and at the same time in an increased formation of kallus and roots.

After transplanting the vine plants, they are again treated with the normal amount of the composition according to the present invention with the result that the plants grow more rapidly. The advantage is achieved thereby that the vine plant grows within one year to such a height that it has out-grown the zone of ground frost. Thereby, the time of development is reduced by about one year or by 25%. This reduction in development is also of importance for tree nurseries.

The elongation of the pedicels and peduncles of the grapes due to the treatment according to the present invention produces looser clusters of grapes so that the danger of infection by black rot and other fungi is considerably reduced or even completely eliminated.

The growth promoting agent according to the present invention, in the doses applied, not only is completely nontoxic to plants, but also to animals which might consume treated plants. Although it is not effective against viruses and the like, a favorable effect on various plant diseases could be observed. For instance, when treating strawberries, which are known to be readily affected by viruses, with the composition according to the present invention, it was found that the treated strawberries show a greater resistance against such diseases, since they are growing so fast, that the first runners or stolons are mature enough to produce roots before the virus can immigrate thereinto.

Since faster growing plants require larger quantities of nutritive substances, it is expedient to add fertilizers and especially nitrogen-containing fertilizers to the compositions according to the present invention. Addition of potassium nitrate which serves as carrier material as well as fertilizer has proved to be very advantageous.

Furthermore, it is advisable to add the conventional trace elements to said compositions. Especially suitable are those trace elements which are required for the formation of the necessary vitamins, such as cobalt salts. Thereby a marked synergism between the added active agents and those which are produced by the plant is achieved.

In order to ensure good adherence of the active agents to the surface of the plants, it is of advantage to add conventional surface-active agents to the compositions according to the present invention, such as the surface-active agents sold under the trademark "Texapon," "Tween 80," "Pril" and so on.

The compositions according to the present invention are preferably applied by spraying the plants to be treated with an aqueous solution of the degradation product of yeast nucleic acid and gibberellic acid or its salts. Since said active agents are retained by the plants for a prolonged period of time, it is not necessary to treat the plants daily with small amounts thereof. On the contrary, even better results are obtained when treating the plants in intervals of 8 days to 14 days with a relatively more concentrated solution. It is not necessary to apply the compositions to the vegetation cones of the plants. The rate of diffusion in all directions of the active agents is very considerable, in contrast to that of other active agents. Therefore, spraying of only the epigeous parts of the plants suffices.

Other means of applying the compositions according to the present invention consist in brushing the plants therewith or in soaking and steeping the seeds in solutions thereof before sowing.

Of course, it is also possible to apply compositions according to the present invention to the plants to be treated by injection or to treat the plants with pastes of the active agents. The agents may also be added to nutrient solutions. However, these modes of application are not as effective and economical as the above described treatment by spraying.

The compositions according to this invention are usually employed in aqueous solutions containing, per liter, 1 mg. to 100 mg. of gibberellic acid and 10 mg. to 2000 mg. of the degradation product of yeast nucleic acid.

The following examples serve to illustrate the composition of preparations according to the present invention without, however, being limited thereto.

EXAMPLE 1

10 mg. of the potassium salt of gibberellic acid,
10 mg. of the mixture of adenine, guanine, uridine monophosphate, and cytidine monophosphate obtained by acid hydrolysis of yeast nucleic acid,
2,000 mg. of potassium nitrate,
10 mg. of cobaltous sulfate, and
100 mg. of a surface-active agent of the higher fatty alcohol sulfonate-type sold under the trademark "Texapon"

are intimately mixed with each other, whereby the surface-active agent is finally added to the mixture. The resulting mixture is filled into plastic bags, each containing about 2.13 g. Said amount is sufficient to yield, on dissolving it in water, about one liter of spray liquid. The plastic bags are sealed.

EXAMPLE 2

50 mg. of the potassium salt of gibberellic acid,
50 mg. of the mixture of adenine, guanine, uridine monophosphate, and cytidine monophosphate obtained by acid hydrolysis of yeast nucleic acid,
2,000 mg. of potassium nitrate,
50 mg. of cobaltous sulfate, and
100 mg. of a surface-active agent of the higher fatty alcohol sulfonate-type sold under the trademark "Texapon"

are intimately mixed with each other, whereby the surface active agent is finally added to the mixture. The resulting mixture is filled into plastic bags, each containing about 2.25 g. Said amount is sufficient to yield, on dissolving it in water, about one liter of spray liquid. The plastic bags are sealed.

EXAMPLE 3

10 mg. of the sodium salt of gibberellic acid,
100 mg. of the mixture of adenine, guanine, uridine monophosphate, and cytidine monophosphate obtained by acid hydrolysis of yeast nucleic acid,
10 mg. of cobaltous nitrate, and
100 mg. Tween 80 are mixed with potassium nitrate ad 2000 mg. The resulting mixture is filled into plastic bags which are sealed. It is sufficient to yield one liter of spray liquid.

EXAMPLE 4

10 mg. of the sodium salt of gibberellic acid,
500 mg. of the mixture of adenine, guanine, uridine monophosphate, and cytidine monophosphate obtained by acid hydrolysis of yeast nucleic acid,
10 mg. of cobaltous nitrate, and
100 mg. Tween 80 are mixed with potassium nitrate ad 2000 mg. The resulting mixture is filled into plastic bags which are sealed. It is sufficient to yield one liter of spray liquid.

The solution of Example 1 represents the normally used spray solution, and will be designated as solution A, while the solution of Example 2 is the concentrated spray solution which will be designated as solution B. The following Table V indicates in what manner these two solutions may be employed and what results are achieved:

In conclusion it may be pointed out that the compositions according to the present invention are useful in all

TABLE V

| Plant | When treated | Amounts used | Results | Remarks |
|---|---|---|---|---|
| Asparagus sprengeri. | Fall to spring | 5x solution B in weekly intervals. | Acceleration of formation of shoots, increase in number of shoots, increase in green and dry weight, especially in winter. | To obtain better yields, fertilizing necessary when applying solution B for a prolonged period of time. |
| Cyclamen | In the budding stage, buds must be visible but not longer than 2-3 cm. | (a) once solution B. (b) 3x solution A in weekly intervals. | More rapid and simultaneous blossoming of many buds. | Plants can be sold at an earlier predetermined date (2-3 weeks). Longer pedicles which is of advantage for cut flowers. |
| Hydrangea | Flowering stage, diameter of flowers must exceed 2 cm. | (a) 4x solution A, in 4 days | More uniform blossoming of the inflorescences. Acceleration of blossoming by 4 to 10 days. | Additional fertilization is required. |
| Fuchsia | Young plants until shortly before their blossoming. | (a) 1x solution. (b) 3x to 4x solution A in weekly intervals. | Stronger and larger plants, more lateral shoots are formed, more uniform blossoming, larger flowers. | Long-boled plants can be produced on continuous treatment with solution B in intervals of 2 to 3 weeks. When crown of plant has formed, spraying must be discontinued. |
| Pelargonium zonale and peltatum and hybrids. | Rooted cuttings to young plants. | (a) 3x to 4x solution B in weekly intervals. (b) 3x to 7x solution A in weekly intervals. | More rapid vegetative growth, larger flowers and leaves, larger shoots, accelerated blossoming of present buds. | |
| Begonia Gloire de Lorraine. | Young plants | (a) 2x to 3x solution A in weekly intervals. (b) 1x solution B. | More rapid vegetative growth. Shrub-like plants can be produced. | |
| Begonia semperflorens. | do | 2x to 3x solution A in intervals of 8 days to 14 days. | Better growth, more leaves and flowers greener color. | |
| Bougainvillea glabra. | do | (a) about 10x solution A in weekly intervals. (b) Preferably 5x solution B in weekly intervals. | More vigorous vegetative growth, longer shoots with only slightly elongated internodes. | |
| Cissus antarctica | do | 3x solution A in weekly intervals. | Improved growth, first smaller leaves which, however after 3 to 4 weeks attain their normal size. | |
| Coleus hybrid | Rooted cuttings to young plants. | (a) 5x to 6x solution A in weekly intervals. (b) 2x to 3x solution B in weekly intervals. | More rapid growth, improved shooting forth of lateral buds. | |
| Columnea | Young plants | (a) 5x to 6x solution A in weekly intervals. (b) 2x to 3x solution B in 9 weekly intervals. | More vigorous growth, elongation of shoots, increased shooting forth. | |
| Euphorbia pulcherrima. | Rooted cuttings | 1x solution A subsequently, if required, 2x solution A in larger intervals depending upon the desired length of shoot. | Acceleration of growth, satisfactory length of pedicels. | Spraying must be discontinued shortly before flowering. |
| Lonicera japonica | Young plants | 1x to several times solution A, as long as growth is desired. | Long shoots, even in winter, i.e. during resting period. | |
| Peperomia glabella | do | (a) 8x to 10x solution A in weekly intervals. (b) 4x to 5x solution B in 6 weekly intervals. | Accelerated growth, improved formation of lateral shoots, treated plants are larger and have somewhat longer internodes. | |
| Saintpaulia ionantha. | do | 1x to 2x solution A in weekly intervals. | Considerably larger plants, erect growth, accelerated flowering, in general improved appearance. | |
| Scindapsus aureus | do | 3x to 4x solution A in 6 weekly intervals. | Accelerated growth | Additional fertilization desired. |
| Sinningia speciosa | Young plants, budding stage. | 1x solution A | Development accelerated, more rapid blossoming of the present buds. | |
| Chrysanthemum leucanthemum. | 4 to 6 weeks before the flowers are cut. | 2x solution A in weekly intervals. | More vigorous growth, longer lateral shoots with more and larger flowers, flowering about 10 days earlier. | |

One liter of the spray solutions A or B are usually sufficient to uniformly spray 100 to 150 plants, depending upon their size, for instance, about 125 Cyclamen plants in the budding stage or 200 Fuchsia young plants with the formation of lateral shoots setting in.

The sealed plastic bags containing about 2 g. of active agents are stable if kept under dry conditions and at relatively low temperature. The aqueous spray solutions A and B made therefrom, however, are stable for a short period of time only. They must be used within about 5 to 6 hours after preparation since, after 12 hours, about 40% of the gibberellic acid is already inactivated.

As stated above, the compositions according to the present invention may be employed for the treatment of other plants than those specifically discussed hereinabove in Table V.

The preferred proportion of gibberellic acid to the degradation product of yeast nucleic acid is a proportion of 1:10-50. However, said proportion may vary between 1:1 and 1:100. Optimum proportions can readily be determined for each species of plant by preliminary experiments.

instances where gibberellic acid has been used alone. They (a) Accelerate embryo development and germination,
(b) Induce prompt germination of dormant seeds,
(c) Stimulate growth of the seedlings and increase cell division, thus causing stem elongation,
(d) Accelerate and increase the growth of pedicels, peduncles, or leaves,
(e) Effect shooting forth of dormant terminal buds,
(f) Cause elongation of stems and shoots as well as lateral growth,
(g) Change the behavior of biennial plants to that of annual plants,
(h) Accelerate flower induction,
(i) Stimulate pollen tube growth,
(j) Cause increased growth of pedicels, seedless grapes, cotton fibers, cherry fruits, and the like,
(k) Stimulate stolon growth, and have other plant growth affecting effects.

I claim:
1. A process of promoting the growth of plants com- prising treating plants with the mixture of a gibberellin compound selected from the group consisting of gibberellic acid and its alkali metal salts, and the hydrolytic degradation product of yeast nucleic acid obtained by acid hydrolysis and consisting of a mixture of adenine, guanine, uridine monophosphate, and cytidine monophosphate, said gibberellin compound and said degradation product being present in said mixture in the proportion between about 1:1 and about 1:100.

2. A process of promoting the growth of plants comprising spraying plants with an aqueous solution containing, per liter, 1 mg. to 100 mg. of an alkali metal salt of gibberellic acid and 10 mg. to 2000 mg. of the mixture of adenine, guanine, uridine monophosphate, and cytidine monophosphate obtained by acid hydrolysis of yeast nucleic acid.

3. A composition for promoting the growth of plants comprising a gibberellin compound selected from the group consisting of a gibberellic acid and its alkali metal salts, and the mixture of adenine, guanine, uridine monophosphate, and cytidine monophosphate obtained by acid hydrolysis of yeast nucleic acid, said gibberellin compound and said mixture being present in said composition in the proportion between about 1:1 and about 1:100.

4. A composition for promoting the growth of plants comprising between about 1 mg. and about 100 mg. of an alkali metal salt of gibberellic acid, between about 10 mg. and about 2000 mg. of the mixture of adenine, guanine, uridine monophosphate, and cytidine monophosphate obtained by acid hydrolysis of yeast nucleic acid, between about 10 mg. and about 50 mg. of a water soluble cobalt salt, about 100 mg. of a wetting agent, and about 2 g. of potassium nitrate.

5. An aqueous spray solution for promoting the growth of plants comprising a gibberellin compound selected from the group consisting of gibberellic acid and its alkali metal salts, and the hydrolytic degradation product of yeast nucleic acid obtained by acid hydrolysis and consisting of a mixture of adenine, guanine, uridine monophosphate, the cytidine monophosphate, said gibberellin compound and nucleic acid degradation product being dissolved and being present in said solution in the proportion between about 1:1 and about 1:100.

References Cited in the file of this patent

UNITED STATES PATENTS

| | | |
|---|---|---|
| 2,842,051 | Brian et al. | July 8, 1958 |
| 2,993,048 | Shive | July 18, 1961 |
| 3,004,845 | Pierre | Oct. 17, 1961 |

FOREIGN PATENTS

| | | |
|---|---|---|
| 1,052,741 | Germany | Mar. 12, 1959 |

OTHER REFERENCES

Goldacre et al.: Nature, vol. 179, April 1957, pp. 877–878.

Miller et al.: J. Am. Chem. Soc., vol. 78, 1956, pp. 1375–1380.

Vasil et al.: Science, vol. 126, December 20, 1957, pp. 1294–1295.

Humphries: Nature, vol. 181, April 12, 1958, pp. 1081–1082.

Scott et al.: Science, vol. 126, July 19, 1957, pp. 122 and 123.